United States Patent [19]
Fenner et al.

[11] 3,919,099
[45] Nov. 11, 1975

[54] BARIUM TITANATE CERAMIC DIELECTRIC ELEMENT

[75] Inventors: Erich Fenner, Gauting; Renate Kuschke, Forstinning, both of Germany

[73] Assignee: Siemens Aktiengesellschaft, Berlin & Munich, Germany

[22] Filed: Sept. 24, 1973

[21] Appl. No.: 400,330

[30] Foreign Application Priority Data
Sept. 29, 1972 Germany............... 2247978

[52] U.S. Cl. .................. 252/63.2; 252/63.5
[51] Int. Cl.² .................. H01B 3/00; H01B 3/18
[58] Field of Search........... 252/63.2, 63.5, 63.7

[56] References Cited
UNITED STATES PATENTS
2,946,937  7/1960  Herbert............... 252/63.2

OTHER PUBLICATIONS
Baxter, et al., *Journal of the American Ceramic Society*, Vol. 42, No. 110 pp. 465–470, 1959.

*Primary Examiner*—Benjamin R. Padgett
*Assistant Examiner*—Josephine Lloyd
*Attorney, Agent, or Firm*—Hill, Gross, Simpson, Van Santen, Steadman, Chiara & Simpson

[57] ABSTRACT

A ceramic dielectric element having a low dependence of the dielectric constant on temperature over a given operating temperature range and being composed of a mixture of a barium titanate component, an iron component and either a zinc or a nickel component.

9 Claims, 2 Drawing Figures

BARIUM TITANATE CERAMIC DIELECTRIC ELEMENT

BACKGROUND OF THE INVENTION

1. Field of the Invention

The invention relates to ceramic dielectric elements and somewhat more particularly to ceramic dielectric elements having a high efficiency and low temperature dependence, useful for example in VHF and L-C filter structures.

2. Prior Art

It is known that ceramic dielectric bodies having electrical capacitance can be produced from barium titanate and similar materials. For example, German Auslegenschrift No. 1,117,766 suggests a capacitor dielectric composed essentially of barium titanate and containing, for example, an iron or iron oxide component.

In addition to the above German Auslegenschrift, an extremely extensive prior art store of knowledge exists as to the use of barium titanate as a dielectric material. An abundance of research has been carried out to determine various effects attained by adding various substances to barium titanate. In particular, investigations have been conducted seeking to discover a ceramic dielectric which exhibits a low temperature response of the dielectric constant over a given temperature range. For example, it is known that in the vicinity of the Curie point, barium titanate exhibits a strong temperature dependence of the temperature coefficient. A reduction in this marked temperature dependence has been achieved by inclusions of certain metal oxides (generally iron) with barium titanate.

Iron has, in fact, also been described as an additive to barium titanate in a quite different context, namely in connection with piezoelectric ceramics. For example, German Auslegenschrift No. 1,671,076 suggests that an increase in the mechanical $Q_M$ factor is achieved by additions of iron.

Additions of iron oxide to barium titanate yield improved temperature response characteristics to dielectric substrates produced therefrom. However, such additions cause higher loss factors, i.e. a low dielectric efficiency. Accordingly, it is desirable to provide a dielectric having a high efficiency and a low temperature dependence.

SUMMARY OF THE INVENTION

The invention provides a ceramic dielectric element characterized by a high dielectric constant (i.e. 1000 to 2000) which is substantially independent ($\pm 3$ to $\pm 8\%$) of temperature and has a relatively low loss factor ($< 10^{-2}$) over a given operating temperature range ($-20°$ to $+130°$ C.).

The ceramic elements of the invention are composed of a mixture which include a major proportion of a barium titanate component, about 0.5 to 5% by weight of an iron component and about 0.1 to 5% by weight of a further component composed of a material selected from the group consisting of nickel and zinc, with the above components being calculated as their respective oxides. The ceramic dielectric elements of the invention are produced by mixing starting materials (barium carbonate, titanium dioxide, iron oxide, and nickel or zinc oxide) and subjecting them to a wet-grinding process, heating the wet-ground mixture at about 1050°C., regrinding the heated mixture and forming it into a desired substrate shape, as with the aid of a bonding agent and then sintering the formed substrate at temperatures in the range of about 1330° to 1370° C. for about 30 to 120 minutes. The formed dielectric substrates are suitable for the installation of electric circuits thereon and by providing surface electrodes on such substrates, one attains a capacitor with given electric properties.

DESCRIPTION OF THE PREFERRED EMBODIMENTS

Figure 1:
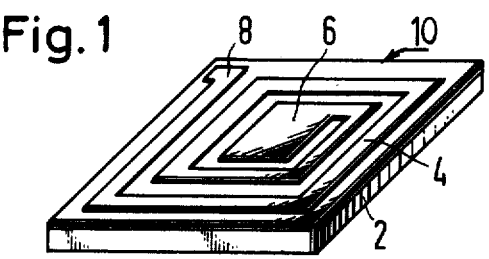
FIG. 1 is an elevated perspective view of a surface of an L-C filter structure, which includes a ceramic dielectric substrate formed in accordance with the principles of the invention.

The invention provides a ceramic dielectric substrate, which even at high frequencies is characterized by a high, relatively constant dielectric value, which is substantially independent of temperature over a given operating temperature range and is further characterized by a relatively low loss factor over the entire operating temperature range. The loss factor of dielectric substrates produced in accordance with the principles of the invention are sufficiently low for frequencies in the VHF range. In preferred practical applications of the dielectric substrates of the invention, they comprise dielectric elements in VHF filters and L-C filter structures formed by layer circuit processes. Layer circuits include thin-layer, thick-layer and printed and/or etched circuits.

Ceramic dielectric elements of the invention are composed of a mixture which includes a major proportion of a barium titanate component, an iron component and a further component composed of a material selected from the group consisting of nickel and zinc.

In certain preferred embodiments of the invention, dielectric elements are composed of a mixture of barium titanate, about 0.5 to 5% by weight and most preferably at least 1% by weight of iron, calculated as $Fe_2O_3$ and about 0.1 to 5% by weight and most preferably at least 0.5% by weight of zinc, calculated as ZnO.

In other preferred embodiments of the invention, dielectric elements are composed of a mixture of barium titanate, about 0.5 to 5% by weight and most preferably at least 1% by weight of iron, calculated as $Fe_2O_3$ and about 0.1 to 5% by weight and most preferably at least 0.3% by weight of nickel, calculated as NiO.

In considering the overall invention, particularly favorable values of the dielectric constant, the loss factor and the temperature and frequency dependence of the latter are attained with dielectric elements formed of a mixture of barium titanate, 1.5% of iron and either 0.8% by weight of zinc or 0.5 to 0.7% by weight of nickel, with the content of each of the above components being calculated as the weight percentage of their respective oxides.

A specific exemplary embodiment of the invention, which will be discussed in detail hereinafter and which possesses favorable electric values and favorable mechanical characteristics and which particularly possesses an extremely low degree of temperature dependence is a dielectric element composed of a mixture of barium titanate, 2.0% by weight of iron (calculated as $Fe_2O_3$) and 2.2% by weight of zinc (calculated as ZnO).

The materials disclosed herein as forming dielectric elements, particularly those of the preferred embodiments, are suitable for the production of various dielectric elements, such as plate-shaped bodies having dimensions of 25 × 25 × 1 mm. The select materials are formed into dielectric elements in a conventional manner, using a molding process and are then sintered. Further details of a preferred method of producing the dielectric elements of the invention are set forth hereinafter.

Generally, in the production of capacitor dielectrics, pure barium titanate is a preferred major component. However, some advantageous results may be achieved by including certain prior art substituents for their known effects, along with the substituents of the invention.

Dielectric elements formed in accordance with the principles of the invention have a very low degree of porosity. This property is extremely useful, for example, in applying conductor path structures to the surfaces of such dielectric elements. Metallization (i.e. discrete metal areas, layers, lines, etc.) applied to the dielectric elements of the invention are permanently adhered thereon and can be etched with ease during the production of conductor paths or other electric structures.

The ceramic dielectric elements of the invention composed of a mixture of barium titanate, iron and a material selected from the group consisting of nickel and zinc are characterized by dielectric constant values of at least 1000 and up to 2000, with the temperature dependence variation in these constant values being less than about ± 8% over a temperature range of −20° to +130° C. and being less than about ± 3% over the temperature range of +20° to 80° C. These dielectric elements also exhibit a loss factor, tan δ of less than $10^{-2}$ and show a temperature dependence of less than $±3 × 10^{-3}$ over a temperature range of −20° to +100° C.

A further advantageous characteristic of the dielectric bodies of the invention is that they exhibit a low frequency dependence of the loss factor, tan δ. For example, even in the VHF range, tan δ values are obtained which still remain below $10^{-2}$ (VHF = 50 to 300 MHz).

The invention resulted from a recognition that an improvement in the temperature response of a ceramic dielectric element could be achieved by inclusion of iron oxide with barium titanate. However, it was found that in order to attain this improvement, it was necessary to accept a higher loss factor, i.e. a lower dielectric efficiency. It was then discovered that it is possible to reduce the loss factor by additions of zinc oxide or nickel oxide to barium titanate-iron oxide mixtures without substantially affecting the temperature dependence of the dielectric constant achieved as a result of the iron inclusion. During the course of these investigations, it was also discovered that the dielectric elements composed of the instant materials are also characterized by a low frequency dependence of their extremely low loss factor.

A process of producing ceramic dielectric bodies in accordance with the invention is summarized below. One commences, in the usual manner, by preparing a mixture of barium carbonate and titanium dioxide in stoichiometric amounts and then intermixing the oxides of iron, nickel or zinc in accordance with the earlier discussions. The resultant mixture is then wetground with water, heat-treated at a temperature of about 1050° reground and formed into a desired shape with the aid of a bonding agent and then sintered at a temperature of about 1350° C. and generally in the range of about 1330° to 1370° C. to form, upon cooling, the desired ceramic dielectric element. The sintering temperature is critical and must be within the range stated above. The sintering process is carried out for a period of time ranging from about 30 to about 120 minutes.

The above process provides a means of producing dielectric elements or substrates such as plates which possess the above described electrical properties. Electric circuits are placed on such plates in accordance with various relevant circuit techniques. By placing a surface electrode on the ceramic dielectric element of the invention, one is able to produce a capacitor having the above described electric properties.

Referring now to the drawings,

FIG. 1 is a perspective view of a L-C filter structure 10 formed with layer circuit techniques. Such a filter structure, which may be printed, is one of the most advantageous uses of a ceramic dielectric element 2 formed in accordance with the principles of the invention. The dielectric element 2 is, for example, a plate having surface dimensions of 10 × 10 mm or 20 × 20 mm and a thickness of about 1 mm. On the front surface, as shown in FIG. 1, a spiral-configured lead 4 is provided. The lead 4 is used as an electric inductance coil for high frequencies. The lead 4 electrically interconnects an electric conductive area 6 with an electric contact area 8. The electric conductive area 6 is deposited on the front surface of the element 2 and forms one electrode of an electric capacitance.

Figure 2:
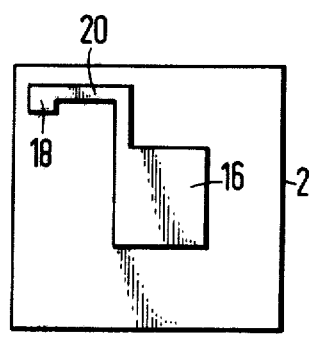
FIG. 2 is a plane view of the reverse side of the structure shown at FIG. 1.

FIG. 2 illustrates the back surface of structure 10. The backside surface of the dielectric element 2 is provided with an electric conductive area 16, such as produced by depositing an appropriate metallic layer thereon. The area 16 comprises the other electrode of the capacitance formed between the electrodes 6 and 16, with the dielectric element 2 separating such electrodes. A lead 20 electrically interconnects electrodes 16 with the contact area 18.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appendant claims.

We claim as our invention:

1. A ceramic dielectric element having a relatively low dependence of the dielectric constant on temperature over a given operating temperature range composed of a mixture including a major proportion of a barium titanate component, about 0.5 to 5% by weight of an iron component, and about 0.1 to 5% by weight of a further component composed of a material selected from the group consisting of nickel and zinc, said components being calculated as their respective oxides.

2. A ceramic dielectric element as defined in claim 1 wherein said iron component is present in said mixture in amounts of at least 1% by weight calculated as $Fe_2O_3$.

3. A ceramic dielectric element as defined in claim 1 wherein said further component is composed of zinc and is present in said mixture in amounts ranging from about 0.1 to 5% by weight calculated as ZnO.

4. A ceramic dielectric element as defined in claim 3 wherein said zinc component is present in said mixture in amounts of at least 0.5% by weight calculated as ZnO.

5. A ceramic dielectric element as defined in claim 1 wherein said further component is composed of nickel and is present in said mixture in amounts ranging from about 0.1 to 5% by weight calculated as NiO.

6. A ceramic dielectric element as defined in claim 5 wherein said nickel component is present in said mixture in amounts of at least 0.3% by weight calculated as NiO.

7. A ceramic dielectric element as defined in claim 1 wherein said iron component is present in said mixture in an amount of about 1.5% by weight and said further component is composed of zinc, said zinc component being present in said mixture in an amount of about 0.8% by weight.

8. A ceramic dielectric element as defined in claim 1 wherein said iron component is present in said mixture in an amount of about 2.0% by weight and said further component is composed of zinc, said zinc component being present in said mixture in an amount of about 2.2% by weight.

9. A ceramic dielectric element as defined in claim 1 wherein said iron component is present in said mixture in an amount of about 1.5% by weight and said further component is composed of nickel, said nickel component being present in said mixture in amounts ranging from about 0.5 to 0.7% by weight.

* * * * *